United States Patent [19]

Higuchi et al.

[11] Patent Number: 4,665,041
[45] Date of Patent: May 12, 1987

[54] DIELECTRIC CERAMIC COMPOSITION FOR HIGH FREQUENCIES

[75] Inventors: Yukio Higuchi; Masayoshi Katsube, both of Ohmihachiman, Japan

[73] Assignee: Murata Manufacturing Co., Ltd., Japan

[21] Appl. No.: 861,239

[22] Filed: May 8, 1986

[30] Foreign Application Priority Data

| May 10, 1985 | [JP] | Japan | 60-100230 |
| May 10, 1985 | [JP] | Japan | 60-100231 |
| Jul. 29, 1985 | [JP] | Japan | 60-167953 |
| Jul. 29, 1985 | [JP] | Japan | 60-167954 |

[51] Int. Cl.$^4$ ............................................. C04B 35/46
[52] U.S. Cl. ................................................... 501/134
[58] Field of Search ......................................... 501/134

[56] References Cited

FOREIGN PATENT DOCUMENTS 1058801 2/1967 United Kingdom ................ 501/134

Primary Examiner—Ferris H. Lander
Attorney, Agent, or Firm—Ostrolenk, Faber, Gerb & Soffen

[57] ABSTRACT

A dielectric ceramic composition for high frequencies comprises a main component of a $TiO_2$-$ZrO_2$-$Sn_2O$ system and contains, as additives, not more than 7 wt % of ZnO, not more than 10 wt % of NiO, and not more than 7 wt % of one metal oxide selected from the group consisting of $Nb_2O_5$, $Ta_2O_5$, $WO_3$ and $Sb_2O_5$. The main component consists essentially of 22 to 43 wt % of $TiO_2$, 38 to 58 wt % of $ZrO_2$, and 9 to 26 wt % of $SnO_2$.

10 Claims, 4 Drawing Figures

DIELECTRIC CERAMIC COMPOSITION FOR HIGH FREQUENCIES

BACKGROUND OF THE INVENTION

1. Field of the Invention

This invention relates to a dielectric ceramic composition for high frequencies. More particularly, the present invention relates to an improved dielectric ceramic composition which possesses a high dielectric constant and a high Q value even in a high frequency region of microwaves and millimetric waves.

2. Description of the Prior Art

In a high frequency region, various dielectric ceramics are widely used for dielectric resonators, dielectric substrates for microwave integrated circuits, and the like because of their useful electrical properties. In recent years, there have been trends to use higher frequencies in microwave systems, and there is an increasing demand for dielectric ceramics with better electrical properties.

To this end a ceramic composition of a system $TiO_2$-$ZrO_2$-$SnO_2$-$ZnO$-$NiO$ has been developed as a dielectric material for high frequencies and is disclosed in Japanese publication No. 55-34526. However, a flow Q value at high frequencies of this material makes its general use impossible. For example, the Q values of this material are 25000 at 1 GHz, 12000 at 4 GHz, and 7000 at 7 GHz. Thus, when this material is used for dielectric resonators in a high power circuit operated at a low frequency, e.g., at 800 MHz, it generates a large amount of heat, thus making its stable operation impossible. Also, the Q value of this material is too low to use it as dielectric resonators operated at a frequency of 4 GHz or 10 GHz.

In order to solve this problem, it has been proposed to replace ZnO or NiO with $Ta_2O_5$ in the system $TiO_2$-$ZrO_2$-$SnO_2$-$ZnO$-$NiO$ in Japanese patent laid-open Nos. Nos. 58-51406 and 58-217465. The former composition consists essentially of a main component composed of 22 to 43 weight percent (wt %) of $TiO_2$, 38 to 58 wt % of $ZrO_2$ and 9 to 26 wt % of $SnO_2$, and additives of not more than 7 wt % of ZnO and not more than 5 wt % of $Ta_2O_5$. The latter differs from the former in that the additives consists of not more than 10 wt % of NiO and not more than 5 wt % of $Ta_2O_5$.

The replacement of ZnO or NiO in the $TiO_2$-$ZrO_2$-$SnO_2$-$ZnO$-$NiO$ system with Ta increases the Q value in some degree, but the maximum Q value of these materials is 8000 at 7GHz. In addition, there is still room for improvement in their sintering properties.

SUMMARY OF THE INVENTION

It is therefore an object of the present invention to provide a dielectric ceramic composition for high frequencies which possesses a higher Q value even in a microwave frequency region and has improved sintering properties.

Another object of the present invention is to provide a dielectric ceramic composition for high frequencies having a relatively high dielectric constant, a high Q value and improved sintering properties.

According to the present invention these and other objects are solved by incorporating additives composed of not more than 7 wt % of ZnO, not more than 10 wt % of NiO and not more than 7 wt % of one metal oxide selected from the group consisting of $Nb_2O_5$, $Ta_2O_5$, $WO_3$ and $Sb_2O_5$ into a basic composition consisting essentially of 22 to 43 wt % of $TiO_2$, 38 to 58 wt % of $ZrO_2$, and 9 to 26 wt % of $SnO_2$.

DETAILED DESCRIPTION OF THE PRESENT INVENTION

According to a preferred embodiment of the present invention, there is provided a dielectric ceramic composition consisting essentially of a main component of a $TiO_2$-$ZrO_2$-$Sn_2O$ system, and additives composed of ZnO, NiO and $Nb_2O_5$, the main component being composed of 22 to 43 wt % of $TiO_2$, 38 to 58 wt % of $ZrO_2$, and 9 to 26 wt % of $SnO_2$, the content of ZnO being not more than 7 wt %, the content of NiO being not more than 10 wt %, the content of $Nb_2O_5$ being not more than 5 wt %.

In another preferred embodiment, a dielectric ceramic composition consists essentially of a main component composed of 22 to 43 wt % of $TiO_2$, 38 to 58 wt % of $ZrO_2$ and 9 to 26 wt % of $SnO_2$, and additives composed of ZnO, NiO and $Ta_2O_5$, the content of ZnO being not more than 7 wt %, the content of NiO being not more than 10 wt %, the content of $Ta_2O_5$ being not more than 7 wt %.

In further embodiment of the present invention, a dielectric ceramic composition consists essentially of a main component composed of 22 to 43 wt % of $TiO_2$, 38 to 58 wt % of $ZrO_2$ and 9 to 26 wt % of $SnO_2$, and additives composed of ZnO, NiO and $Sb_2O_5$, the content of ZnO being not more than 7 wt %, the content of NiO being not more than 10 wt %, the content of $Sb_2O_5$ being not more than 7 wt %.

In still another preferred embodiment, a dielectric ceramic composition consists essentially of a main component composed of 22 to 43 wt % of $TiO_2$, 38 to 58 wt % of $ZrO_2$ and 9 to 26 wt % of $SnO_2$, and additives composed of ZnO, NiO and $WO_3$, the content of ZnO being not more than 7 wt %, the content of NiO being not more than 10 wt %, the content of $WO_3$ being not more than 7 wt %.

The reasons why the composition of the main component has been limited to the above range are as follows: If the content of $TiO_2$ is less than 22 wt %, the dielectric constant becomes lowered. If the content of $TiO_2$ is more than 43 wt %, the temperature coefficient of dielectric constant becomes too large on the positive side. If the content of $ZrO_2$ is less than 38 wt % or more than 58 wt %, the temperature coefficient of dielectric constant becomes too large on the positive side. If the content of $SnO_2$ is less than 9 wt %, the temperature coefficient of dielectric constant becomes too large on the positive side, and the Q value becomes lowered. If the content of $SnO_2$ is more than 26 wt %, the temperature coefficient of dielectric constant becomes too large on the negative side.

The contents of respective additives have been limited as being in the above respective ranges for the following reasons.

In the composition containing ZnO, NiO and $Nb_2O_5$ as the additives, if the content of ZnO exceeds 7 wt % with respect to the amount of the main component, the dielectric constant and Q become lowered. If the content of NiO is more than 10 wt %, or if the content of $Nb_2O_5$ is more than 5 wt % with respect to the amount of the main component, the Q becomes too low to put the composition into practical use.

In the composition containing ZnO, NiO and $Ta_2O_5$ as the additives, if the content of ZnO exceeds 7 wt % with respect to the amount of the main component, the dielectric constant and Q become lowered. If the content of NiO is more than 10 wt %, or if the content of Ta$_2$O$_5$ is more than 7 wt % with respect to the amount of the main component, the Q becomes too low to put the composition into practical use.

In the composition containing ZnO, NiO and WO$_3$ as the additives, if the content of ZnO exceeds 7 wt % with respect to the amount of the main component, the dielectric constant and Q become lowered. If the content of NiO is more than 10 wt %, or if the content of WO$_5$ is more than 7 wt % with respect to the amount of the main component, the Q becomes too low to put the composition into practical use.

In the composition containing ZnO, NiO and Sb$_2$O$_5$ as the additives, their contents have been limited as being in the respective above ranges, for the following reasons. If the content of ZnO exceeds 7 wt % with respect to the amount of the main component, the dielectric constant and Q become lowered. If the content of NiO is more than 10 wt %, or if the content of Sb$_2$O$_5$ is more than 7 wt % with respect to the amount of the main component, the Q becomes too low to put the composition into practical use.

The present invention makes it possible to produce dielectric ceramic compositions having a high Q value even at high frequencies, stable sintering properties, and uniform and small crystal grain sizes. For example, the ceramics of the present invention possesses a high Q value of 9000 at 7 GHz with a temperature coefficient of resonant frequency [TC(fo)] of about 0 ppm/°C. These advantages result from the addition of additives mentioned above which contribute to make the grain growth uniform and to inhibit formation of lattice irregularities in the grain crystals. The dielectric ceramic composition of the present invention has a relatively high dielectric constant of about 40 in addition to the high Q value and small temperature coefficient.

Thus, the dielectric ceramic composition of the present invention can be used widely in the field of mobile phones operated at a frequency of 800 MHz and even in that of direct broadcasting by satellite operated at a frequency of 4 GHz or 10 GHz. For example, the dielectric ceramic composition of the present invention can be used for dielectric resonators inserted in high power channel filter circuits of ground-support equipment for mobile phones.

These and other features and advantages of the present invention will be more apparent from the following description with reference to the preferred embodiments thereof.

EXAMPLE 1

Figure 1:
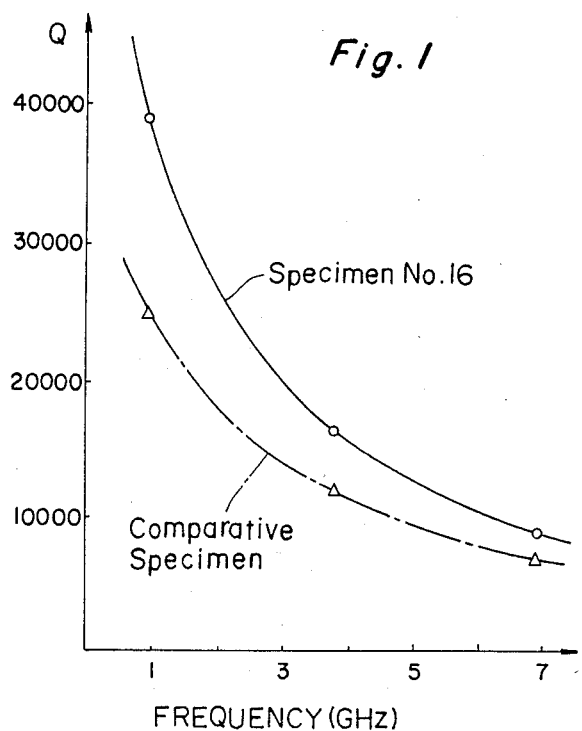
FIGS. 1 to 4 are graphs showing variations of the Q value with frequency for dielectric ceramic compositions of the present invention.

Using highly purified oxides TiO$_2$, ZrO$_2$, SnO$_2$, ZnO, NiO and Nb$_2$O$_5$ as raw materials, there were prepared mixtures so that each of their sintered bodies has a composition shown in Table 1. Each resulting mixture was wet milled in a mill for 16 hours, dehydrated, dried and then pressed into discs having a diameter of 12 mm and a thickness of 6 mm under a pressure of 2500 kg/cm$^2$. The discs were fired in natural atmosphere at 1350° to 1450° C. for 4 hours to prepare ceramic discs.

Each resultant ceramic disc was subjected to measurements of electrical properties. The measurements were made on the dielectric constant ($\epsilon$), quality factor (Q) and temperature coefficient of resonant frequency [TC(fo)].

The dielectric constant ($\epsilon$) and Q value were measured at 25° C. and at 7 GHz by a well-known dielectric resonator method. The temperature coefficient of resonant frequency [TC(fo)] was determined by the equation:

$$TC\ (fo) = \tfrac{1}{2}TC(\epsilon) - \alpha$$

where TC($\epsilon$) is a temperature change rate of dielectric constant measured in a temperature range of +25° to +85° C., and $\alpha$ is a thermal coefficient of linear expansion of the ceramics.

Results are shown in Table 1. In the table, asterisked specimens are those having a composition beyond the scope of the present invention, while other specimens are those included in the scope of the present invention.

For the specimens Nos. 14 and 23, measurements of electrical properties were not carried out since it is impossible to sinter them.

TABLE 1

| Specimen No. | TiO$_2$ | ZrO$_2$ | SnO$_2$ | ZnO | NiO | Nb$_2$O$_5$ | $\epsilon$ | Q | TC($\times 10^{-6}$/°C.) |
|---|---|---|---|---|---|---|---|---|---|
| 1* | 20 | 56 | 24 | 1.0 | 0.2 | 0.5 | 31.5 | 6600 | −14 |
| 2 | 22 | 52 | 26 | 2.0 | 5.0 | 3.0 | 31.0 | 6900 | −10 |
| 3 | 22 | 58 | 20 | 3.0 | 6.0 | 5.0 | 27.5 | 5300 | +33 |
| 4* | 22 | 58 | 20 | 8.0 | 5.0 | 6.0 | 26.5 | 2200 | +41 |
| 5 | 28 | 48 | 24 | 1.0 | 0.5 | 0.5 | 31.2 | 7900 | −14 |
| 6 | 28 | 56 | 16 | 5.0 | 3.0 | 1.0 | 30.2 | 5600 | +17 |
| 7* | 32 | 52 | 16 | 0.5 | 20.0 | 6.0 | 26.8 | 2200 | −8 |
| 8 | 32 | 52 | 16 | 2.0 | 3.0 | 3.0 | 31.4 | 7700 | −4 |
| 9 | 32 | 52 | 16 | 2.0 | 10.0 | 5.0 | 30.3 | 5000 | +2 |
| 10* | 32 | 52 | 16 | 10.0 | 3.0 | 2.0 | 26.0 | 3000 | −1 |
| 11 | 33 | 58 | 9 | 2.0 | 4.0 | 3.0 | 35.8 | 4000 | +26 |
| 12 | 36 | 38 | 26 | 3.0 | 1.0 | 1.0 | 36.2 | 7200 | +6 |
| 13 | 38 | 48 | 14 | 1.0 | 0.5 | 2.0 | 37.0 | 8000 | +2 |
| 14* | 38 | 48 | 14 | 10.0 | 20.0 | 6.0 | | not sintered | |
| 15* | 40 | 36 | 24 | 1.0 | 0.5 | 0.5 | 40.2 | 4600 | +82 |
| 16 | 40 | 39 | 21 | 0.5 | 0.2 | 1.0 | 37.8 | 8800 | −1 |
| 17 | 40 | 39 | 21 | 1.0 | 0.5 | 3.0 | 37.0 | 8600 | −4 |
| 18* | 40 | 39 | 21 | 2.0 | 20.0 | 4.0 | 22.4 | 1800 | +3 |
| 19* | 40 | 39 | 21 | 7.0 | 5.0 | 6.0 | 24.2 | 2300 | −16 |
| 20 | 40 | 44 | 16 | 1.0 | 0.5 | 2.0 | 36.5 | 8400 | +2 |
| 21 | 43 | 38 | 19 | 1.0 | 0.5 | 0.5 | 37.6 | 6700 | +47 |
| 22 | 43 | 48 | 9 | 0.5 | 3.0 | 1.0 | 39.2 | 6000 | +20 |
| 23* | 43 | 48 | 9 | 0.5 | 20.0 | 6.0 | | not sintered | |

TABLE 1-continued

| Specimen No. | TiO$_2$ | ZrO$_2$ | SnO$_2$ | ZnO | NiO | Nb$_2$O$_5$ | $\epsilon$ | Q | TC($\times 10^{-6}$/°C.) |
|---|---|---|---|---|---|---|---|---|---|
| 24 | 43 | 48 | 9 | 2.0 | 10.0 | 1.0 | 37.2 | 4800 | +22 |
| 25* | 43 | 48 | 9 | 10.0 | 10.0 | 6.0 | 34.0 | 1000 | +19 |

From the results shown in Table 1, the dielectric composition of the present invention have a high Q value even at high frequencies and stable sintering properties. For example, the specimen No. 16 has a Q value of 8800 at 7 GHz and a temperature coefficient of resonant frequency [TC(fo)] of about 0 ppm/°C.

For comparison, there was prepared a comparative specimen having a composition consisting of a main component composed of 38 wt % of TiO$_2$, 48 wt % of ZrO$_2$ and 14 wt % of SnO$_2$, and additives of ZnO and NiO, the content of ZnO being 1.0 wt %, the content of NiO being 0.5 wt %.

For the specimen No. 16, and the above comparative specimen, measurements were made on the quality factor (Q) at frequencies ranging from 0.5 GHz to 7 GHz. Results are shown in FIG. 1 as a function of frequency.

From the results shown in FIG. 1, it will be seen that the dielectric ceramic composition according to the present invention is improved in the quality factor (Q). In particular, the quality factor (Q) increases quite rapidly with lowering of frequency and takes values of 39,000 at 1 GHz, 16,500 at 4 GHz, and 8800 at 7 GHz, which are respectively increased by 56%, 38%, and 26 wt % of those of the comparative specimen.

For the specimen No. 16 measurements were made on crystal grain sizes and mechanical strength. It was found that this composition has a grain size distribution ranging from 5 to 10 $\mu$m and a mechanical strength of 1200 Kg/cm$^2$. Thus, it will be seen that the incorporation of Nb$_2$O$_5$ together with ZnO and NiO makes it possible to obtain dielectric ceramics with a fine crystal grain size and a large strength. In other words, the addition of these additives also contribute to make the grain growth uniform and to inhibit formation of lattice irregularities in the grain crystals.

EXAMPLE 2

Using highly purified oxides TiO$_2$, ZrO$_2$, SnO$_2$, ZnO, NiO and Ta$_2$O$_5$ as raw materials, mixtures of raw materials were so prepared that each of their sintered bodies has a composition shown in Table 2. Each resulting mixture was milled by the wet process in a mill for 16 hours, dehydrated, dried and then pressed into discs having a diameter of 12 mm and a thickness of 6 mm under a pressure of 2500 kg/cm$^2$. The discs were fired in natural atmosphere at 1350 to 1450° C. for 4 hours to prepare ceramic discs.

Each resultant ceramic disc was subjected to measurements of electrical properties. The measurements were made on the dielectric constant ($\epsilon$), quality factor (Q) and temperature coefficient of resonant frequency [TC(fo)] in the same manner under the same conditions as in Example 1. Results are shown in Table 2.

In the table, asterisked specimens are those having a composition beyond the scope of the present invention, while other specimens are those included in the scope of the present invention.

For the specimens Nos. 39 and 48, measurements of electrical properties were carried out since it is impossible to sinter them.

TABLE 2

| Specimen No. | TiO$_2$ | ZrO$_2$ | SnO$_2$ | ZnO | NiO | Ta$_2$O$_5$ | $\epsilon$ | Q | TC($\times 10^{-6}$/°C.) |
|---|---|---|---|---|---|---|---|---|---|
| 26* | 20 | 56 | 24 | 1.0 | 0.2 | 0.5 | 33.0 | 6900 | −12 |
| 27 | 22 | 52 | 26 | 2.0 | 5.0 | 5.0 | 31.4 | 7000 | −11 |
| 28 | 22 | 58 | 20 | 3.0 | 6.0 | 7.0 | 28.6 | 5500 | +31 |
| 29* | 22 | 58 | 20 | 8.0 | 5.0 | 10.0 | 25.0 | 2400 | +40 |
| 30 | 28 | 48 | 24 | 1.0 | 0.5 | 0.5 | 31.0 | 7800 | −12 |
| 31 | 28 | 56 | 16 | 5.0 | 3.0 | 2.0 | 30.2 | 5800 | +19 |
| 32* | 32 | 52 | 16 | 0.5 | 20.0 | 1.0 | 28.7 | 2000 | −6 |
| 33 | 32 | 52 | 16 | 2.0 | 3.0 | 3.0 | 30.8 | 7500 | −2 |
| 34 | 32 | 52 | 16 | 2.0 | 10.0 | 5.0 | 30.0 | 5200 | +1 |
| 35* | 32 | 52 | 16 | 10.0 | 3.0 | 10.0 | 25.2 | 2500 | −2 |
| 36 | 33 | 58 | 9 | 2.0 | 4.0 | 4.0 | 35.5 | 5000 | +28 |
| 37 | 36 | 38 | 26 | 3.0 | 1.0 | 1.0 | 35.0 | 7600 | +7 |
| 38 | 38 | 48 | 14 | 1.0 | 0.5 | 1.0 | 38.2 | 8200 | +2 |
| 39* | 38 | 48 | 14 | 10.0 | 20.0 | 6.0 | not sintered | | |
| 40* | 40 | 36 | 24 | 1.0 | 0.5 | 0.5 | 40.5 | 5000 | +80 |
| 41 | 40 | 39 | 21 | 0.5 | 0.2 | 1.0 | 38.0 | 9000 | 0 |
| 42 | 40 | 39 | 21 | 1.0 | 0.5 | 2.0 | 36.2 | 8800 | −2 |
| 43* | 40 | 39 | 21 | 2.0 | 20.0 | 7.0 | 24.6 | 2000 | +8 |
| 44* | 40 | 39 | 21 | 7.0 | 5.0 | 10.0 | 25.5 | 2600 | −10 |
| 45 | 40 | 44 | 16 | 1.0 | 0.5 | 0.5 | 37.8 | 8500 | +1 |
| 46 | 43 | 38 | 19 | 1.0 | 0.5 | 0.5 | 38.1 | 6800 | +48 |
| 47 | 43 | 48 | 9 | 0.5 | 3.0 | 1.0 | 39.7 | 6500 | +27 |
| 48* | 43 | 48 | 9 | 0.5 | 20.0 | 8.0 | not sintered | | |
| 49 | 43 | 48 | 9 | 2.0 | 10.0 | 1.0 | 37.6 | 5100 | +22 |
| 50* | 43 | 48 | 9 | 10.0 | 10.0 | 8.0 | 32.2 | 2000 | +24 |

From the results shown in Table 2, the dielectric composition of the present invention have a high Q value even at 7 GHz, a relatively high dielectric constant and stable sintering properties. For example, the specimen No. 41 has a Q value of 9000 at 7 GHz, a dielectric constant of 38.0, and a temperature coefficient of resonant frequency [TC(fo)] of 0 ppm/°C.

For the specimen No. 41, measurement was made on the quality factor (Q) at various frequencies within the range from 0.5 GHz to 7 GHz. Results are shown in FIG. 2 as a function of frequency together with those for the comparative specimen prepared in Example 1.

Figure 2:
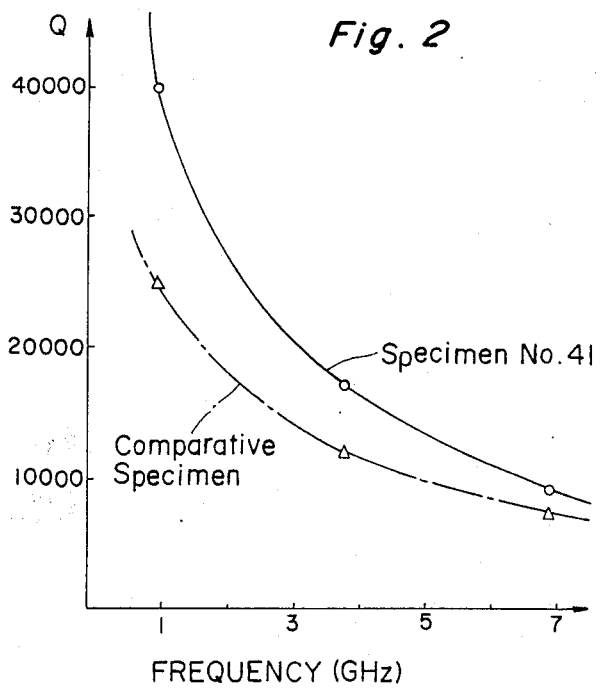

From the results shown in FIG. 2, it will be seen that the dielectric ceramic composition according to the present invention is improved in the quality factor (Q). In particular, the quality factor (Q) is much improved in lower frequency region. For example, the Q values of the dielectric ceramic bodies at various frequencies are 40,000 at 1 GHz, 17,000 at 4 GHz, and 9000 at 7 GHz, which are respectively increased by 60 %, 42%, and 29 wt % of those of the comparative specimen.

For the specimen No. 41, measurements were made on crystal grain sizes and mechanical strength. It was found that this composition has a grain size distribution ranging from 5 to 10 μm and a mechanical strength of 1200 Kg/cm². Thus, it will be seen that the incorporation of $Ta_2O_5$ together with ZnO and NiO makes it possible to obtain dielectric ceramics with a fine crystal grain size and a large strength and that the addition of these additives contribute to make the grain growth uniform and to inhibit formation of lattice irregularities in the grain crystals.

EXAMPLE 3

Using highly purified oxides $TiO_2$, $ZrO_2$, $SnO_2$, ZnO, NiO and $WO_3$ as raw materials, mixtures of raw materials were so prepared that each of their sintered bodies has a composition shown in Table 3. Each resulting mixture was wet milled in a mill for 16 hours, dehydrated, dried and then pressed into discs having a diameter of 12 mm and a thickness of 6 mm under a pressure of 2500 kg/cm². The discs were fired in natural atmosphere at 1350° to 1450° C. for 4 hours to prepare ceramic discs.

Each resultant ceramic disc was subjected to measurements of electrical properties. The measurements were made on the dielectric constant ($\epsilon$), quality factor (Q) and temperature coefficient of resonant frequency [TC(fo)] in the same manner under the same conditions as in Example 1. Results are also shown in Table 3.

In the table, asterisked specimens are those having a composition beyond the scope of the present invention, while other specimens are those included in the scope of the present invention.

For the specimens Nos. 57, 64, and 73, the measurements of electrical properties were not carried out since it is impossible to sinter them.

TABLE 3

| Specimen No. | $TiO_2$ | $ZrO_2$ | $SnO_2$ | ZnO | NiO | $WO_3$ | $\epsilon$ | Q | TC($\times 10^{-6}$/°C.) |
|---|---|---|---|---|---|---|---|---|---|
| 51* | 20 | 56 | 24 | 1.0 | 0.2 | 0.5 | 32.2 | 6800 | −12 |
| 52 | 22 | 52 | 26 | 2.0 | 5.0 | 5.0 | 31.5 | 7100 | −9 |
| 53 | 22 | 58 | 20 | 3.0 | 6.0 | 7.0 | 28.1 | 5200 | +30 |
| 54* | 22 | 58 | 20 | 8.0 | 5.0 | 10.0 | 23.8 | 2000 | +42 |
| 55 | 28 | 48 | 24 | 1.0 | 0.5 | 0.5 | 31.4 | 7800 | −11 |
| 56 | 28 | 56 | 16 | 5.0 | 3.0 | 2.0 | 30.8 | 6000 | +18 |
| 57* | 32 | 52 | 16 | 0.5 | 20.0 | 1.0 | | not sintered | |
| 58 | 32 | 52 | 16 | 2.0 | 3.0 | 3.0 | 31.2 | 7400 | −6 |
| 59 | 32 | 52 | 16 | 2.0 | 10.0 | 5.0 | 30.1 | 5400 | +3 |
| 60* | 32 | 52 | 16 | 10.0 | 3.0 | 10.0 | 24.9 | 2100 | −3 |
| 61 | 33 | 58 | 9 | 2.0 | 4.0 | 4.0 | 35.7 | 5500 | +29 |
| 62 | 36 | 38 | 26 | 3.0 | 1.0 | 1.0 | 36.2 | 7700 | +9 |
| 63 | 38 | 48 | 14 | 1.0 | 0.5 | 1.0 | 38.0 | 8000 | +1 |
| 64* | 38 | 48 | 14 | 10.0 | 20.0 | 6.0 | | not sintered | |
| 65* | 40 | 36 | 24 | 1.0 | 0.5 | 0.5 | 40.1 | 4700 | +78 |
| 66 | 40 | 39 | 21 | 0.5 | 0.2 | 1.0 | 37.9 | 8700 | 0 |
| 67 | 40 | 39 | 21 | 1.0 | 0.5 | 2.0 | 36.3 | 8500 | −4 |
| 68* | 40 | 39 | 21 | 2.0 | 20.0 | 7.0 | 23.9 | 2300 | +9 |
| 69* | 40 | 39 | 21 | 7.0 | 5.0 | 10.0 | 24.6 | 2500 | −7 |
| 70 | 40 | 44 | 16 | 1.0 | 0.5 | 0.5 | 37.5 | 8300 | +2 |
| 71 | 43 | 38 | 19 | 1.0 | 0.5 | 0.5 | 37.9 | 7100 | +45 |
| 72 | 43 | 48 | 9 | 0.5 | 3.0 | 1.0 | 39.9 | 6500 | +24 |
| 73* | 43 | 48 | 9 | 0.5 | 20.0 | | | not sintered | |
| 74 | 43 | 48 | 9 | 2.0 | 10.0 | 1.0 | 37.0 | 4600 | +20 |
| 75* | 43 | 48 | 9 | 10.0 | 10.0 | 8.0 | 31.5 | 2000 | +29 |

From the results shown in Table 3, the dielectric compositions of the present invention have a high Q value even at 7 GHz, a relatively high dielectric constant and stable sintering properties. For example, the specimen No. 66 has a Q value of 8700 at 7 GHz, a dielectric constant of 37.9, and a temperature coefficient of resonant frequency [TC(fo)] of 0 ppm/°C.

For the specimen No. 66, measurement was made on the quality factor (Q) at various frequencies within the range from 0.5 GHz to 7 GHz. Results are shown in FIG. 3 as a function of frequency together with those for the comparative specimen prepared in Example 1.

Figure 3:
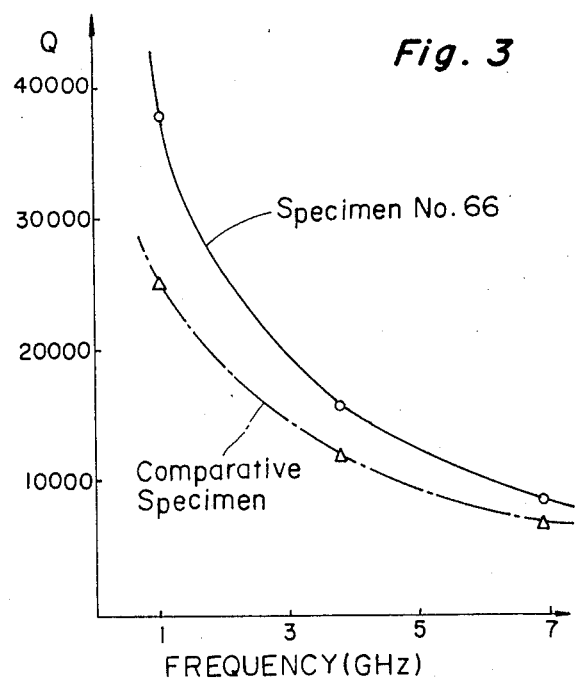

From the results shown in FIG. 3, it will be seen that the dielectric ceramic composition according to the present invention is improved in the quality factor (Q). In particular, the quality factor (Q) increases quite rapidly with lowering of frequency. For example, its Q values are 38,000 at 1 GHz, 16,000 at 4 GHz, and 8700 at 7 GHz, which are respectively increased by 52%, 33%, and 24% of those of the comparative specimen.

For the specimen No. 66, measurements were also made on crystal grain sizes and mechanical strength. It was found that this composition has a grain size distribution ranging from 5 to 10 μm and a mechanical strength of 1200 Kg/cm². Thus, it will be seen that the incorporation of $WO_3$ together with ZnO and NiO makes it possible to obtain dielectric ceramics with a fine crystal grain size and a large strength and that the addition of these additives contribute to make the grain growth uniform and to inhibit formation of lattice irregularities in the grain crystals.

EXAMPLE 4

Using highly purified oxides $TiO_2$, $ZrO_2$, $SnO_2$, ZnO, NiO and $Sb_2O_5$ as raw materials, mixtures of these raw materials were so prepared that each of their sintered bodies has a composition shown in Table 4. Each resulting mixture was wet milled in a mill for 16 hours, dehydrated, dried and then pressed into discs having a diameter of 12 mm and a thickness of 6 mm under a pressure of 2500 kg/cm$^2$. The discs were fired in natural atmosphere at 1350° to 1450° C. for 4 hours to prepare ceramic discs.

Each resultant ceramic disc was subjected to measurements of electrical properties. The measurements were made on the dielectric constant ($\epsilon$), quality factor (Q) and temperature coefficient of resonant frequency [TC(fo)] in the same manner under the same conditions as in Example 1. Results are also shown in Table 4.

In the table, asterisked specimens are those having a composition beyond the scope of the present invention, while other specimens are those included in the scope of the present invention. For the specimens Nos. 82, 89, and 98, the measurements of electrical properties were not carried out since it is impossible to sinter them.

TABLE 4

| Specimen No. | TiO$_2$ | ZrO$_2$ | SnO$_2$ | ZnO | NiO | Sb$_2$O$_5$ | $\epsilon$ | Q | TC($\times 10^{-6}$/°C.) |
|---|---|---|---|---|---|---|---|---|---|
| 76* | 20 | 56 | 24 | 1.0 | 0.2 | 0.5 | 31.8 | 7000 | $-12$ |
| 77 | 22 | 52 | 26 | 2.0 | 5.0 | 5.0 | 30.6 | 7200 | $-10$ |
| 78 | 22 | 58 | 20 | 3.0 | 6.0 | 7.0 | 27.9 | 5300 | $+30$ |
| 79* | 22 | 58 | 20 | 8.0 | 5.0 | 10.0 | 25.4 | 2600 | $+39$ |
| 80 | 28 | 48 | 24 | 1.0 | 0.5 | 0.5 | 30.8 | 7700 | $-11$ |
| 81 | 28 | 56 | 16 | 5.0 | 3.0 | 2.0 | 30.0 | 5600 | $+19$ |
| 82* | 32 | 52 | 16 | 0.5 | 20.0 | 1.0 | | not sintered | |
| 83 | 32 | 52 | 16 | 2.0 | 3.0 | 3.0 | 31.0 | 7700 | $-2$ |
| 84 | 32 | 52 | 16 | 2.0 | 10.0 | 5.0 | 29.8 | 5600 | 0 |
| 85* | 32 | 52 | 16 | 10.0 | 3.0 | 10.0 | 24.8 | 2300 | $-3$ |
| 86 | 33 | 58 | 9 | 2.0 | 4.0 | 4.0 | 36.0 | 5500 | $+27$ |
| 87 | 36 | 38 | 26 | 3.0 | 1.0 | 1.0 | 36.2 | 7800 | $+9$ |
| 88 | 38 | 48 | 14 | 1.0 | 0.5 | 1.0 | 38.2 | 8000 | $+3$ |
| 89* | 38 | 48 | 14 | 10.0 | 20.0 | 6.0 | | not sintered | |
| 90* | 40 | 36 | 24 | 1.0 | 0.5 | 0.5 | 40.2 | 5300 | $+75$ |
| 91 | 40 | 39 | 21 | 0.5 | 0.2 | 1.0 | 37.8 | 8700 | 0 |
| 92 | 40 | 39 | 21 | 1.0 | 0.5 | 2.0 | 36.2 | 8500 | $-4$ |
| 93* | 40 | 39 | 21 | 2.0 | 20.0 | 7.0 | 23.0 | 1600 | $+3$ |
| 94* | 40 | 39 | 21 | 7.0 | 5.0 | 10.0 | 24.1 | 2000 | $-12$ |
| 95 | 40 | 44 | 16 | 1.0 | 0.5 | 0.5 | 37.5 | 7900 | $-1$ |
| 96 | 43 | 38 | 19 | 1.0 | 0.5 | 0.5 | 37.8 | 6500 | $+49$ |
| 97 | 43 | 48 | 9 | 0.5 | 3.0 | 1.0 | 39.3 | 6000 | $+27$ |
| 98* | 43 | 48 | 9 | 0.5 | 20.0 | 8.0 | | not sintered | |
| 99 | 43 | 48 | 9 | 2.0 | 10.0 | 1.0 | 37.4 | 4800 | $+23$ |
| 100* | 43 | 48 | 9 | 10.0 | 10.0 | 8.0 | 32.0 | 2200 | $+25$ |

From the results shown in Table 4, the dielectric compositions of the present invention have a high Q value even at 7 GHz, a relatively high dielectric constant and stable sintering properties. For example, the specimen No. 91 has a Q value of 8700 at 7 GHz, a dielectric constant of 37.8 and a temperature coefficient of resonant frequency [TC(fo)] of 0 ppm/°C.

For the specimen No. 91, measurement was made on the quality factor (Q) at various frequencies within the range from 0.5 GHz to 7 GHz. Results are shown in FIG. 4 as a function of frequency together with those for the comparative specimen prepared in Example 1.

Figure 4:
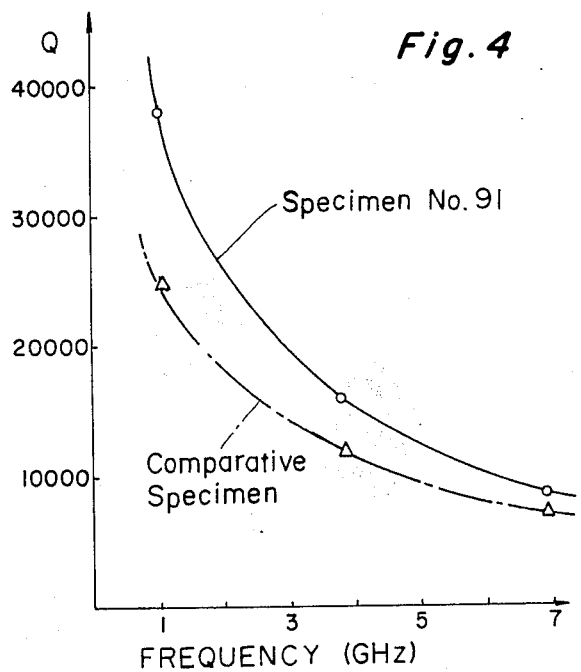

From the results shown in FIG. 4, it will be seen that the dielectric ceramic composition according to the present invention is improved in the quality factor (Q). In particular, the quality factor (Q) is much improved in lower frequency region. For example, its Q values are 38,000 at 1 GHz, 16,000 at 4 GHz, and 8700 at 7 GHz, which are respectively increased by 52%, 33%, and 24 wt % of those of the comparative specimen.

For the specimen No. 91, measurements were made on crystal grain sizes and mechanical strength. It was found that this composition has a grain size distribution ranging from 5 to 10 $\mu$m and a mechanical strength of 1200 Kg/cm$^2$. Thus, it will be seen that the incorporation of Sb$_2$O$_5$ together with ZnO and NiO makes it possible to obtain dielectric ceramics with a fine crystal grain size and a large strength. It is believed that the addition of these additives contribute to make the grain growth uniform and to inhibit formation of lattice irregularities in the grain crystals.

What we claim is:

1. A dielectric ceramic composition for high frequencies consisting essentially of a main component of a TiO$_2$-ZrO$_2$-SnO$_2$ system and additives composed of ZnO, NiO, and one metal oxide selected from the group consisting of Nb$_2$O$_5$, Ta$_2$O$_5$, WO$_3$ and Sb$_2$O$_5$, said main component consisting essentially of 22 to 43 wt % of TiO$_2$, 38 to 58 wt % of ZrO$_2$, and 9 to 26 wt % of SnO$_2$, the content of ZnO being not more than 7 wt %, the content of NiO being not more than 10 wt %, the content of one metal oxide selected from the group consisting of Nb$_2$O$_5$, Ta$_2$O$_5$, WO$_3$ and Sb$_2$O$_5$ being not more than 7 wt %.

2. The dielectric ceramic composition according to claim 1 containing 40 weight % TiO$_2$, 39 weight % ZrO$_2$, 21 weight % of SnO$_2$, as said main component and, as additives, 0.5% of ZnO, 0.2% of NiO and 1 weight % of said metal oxide.

3. The dielectric ceramic composition according to claim 1 containing, as additives, not more than 7 wt % of ZnO, not more than 10 wt % of NiO, and not more than 5 wt % of Nb$_2$O$_5$.

4. The dielectric ceramic composition according to claim 3 containing, as additives, 0.5 to 5 weight % ZnO, 0.2 to 10 weight % of NiO and 0.5 to 5 weight % of Nb$_2$O$_3$.

5. The dielectric ceramic composition according to claim 1 containing, as additives, not more than 7 wt % of ZnO, not more than 10 wt % of NiO, and not more than 7 wt % of Ta$_2$O$_5$.

6. The dielectric ceramic composition according to claim 5 containing, as additives, 0.05 to 5 weight % ZnO, 0.2 to 10 weight % of NiO and 0.5 to 7 weight % of Ta$_2$O$_5$.

7. The dielectric ceramic composition according to claim 1 containing, as additives, not more than 7 wt % of ZnO, not more than 10 wt % of NiO, and not more than 7 wt % of $Sb_2O_5$.

8. The dielectric ceramic composition according to claim 7 containing, as additives, 0.5 to 5 weight % ZnO, 0.2 to 10 weight % of NiO and 0.5 to 7 weight % of $Sb_2O_5$.

9. The dielectric ceramic composition according to claim 1 containing, as additives, not more than 7 wt % of ZnO, not more than 10 wt % of NiO, and not more than 7 wt % of $WO_3$.

10. The dielectric ceramic composition according to claim 9 containing, as additives, 0.5 to 5 weight % ZnO, 0.2 to 10 weight % of NiO and 0.5 to 7 weight % of $WO_2$.

* * * * *